June 21, 1960  M. E. KARP  2,941,795
DOOR OPERATION AND CONTROL
Original Filed March 30, 1953  5 Sheets-Sheet 5

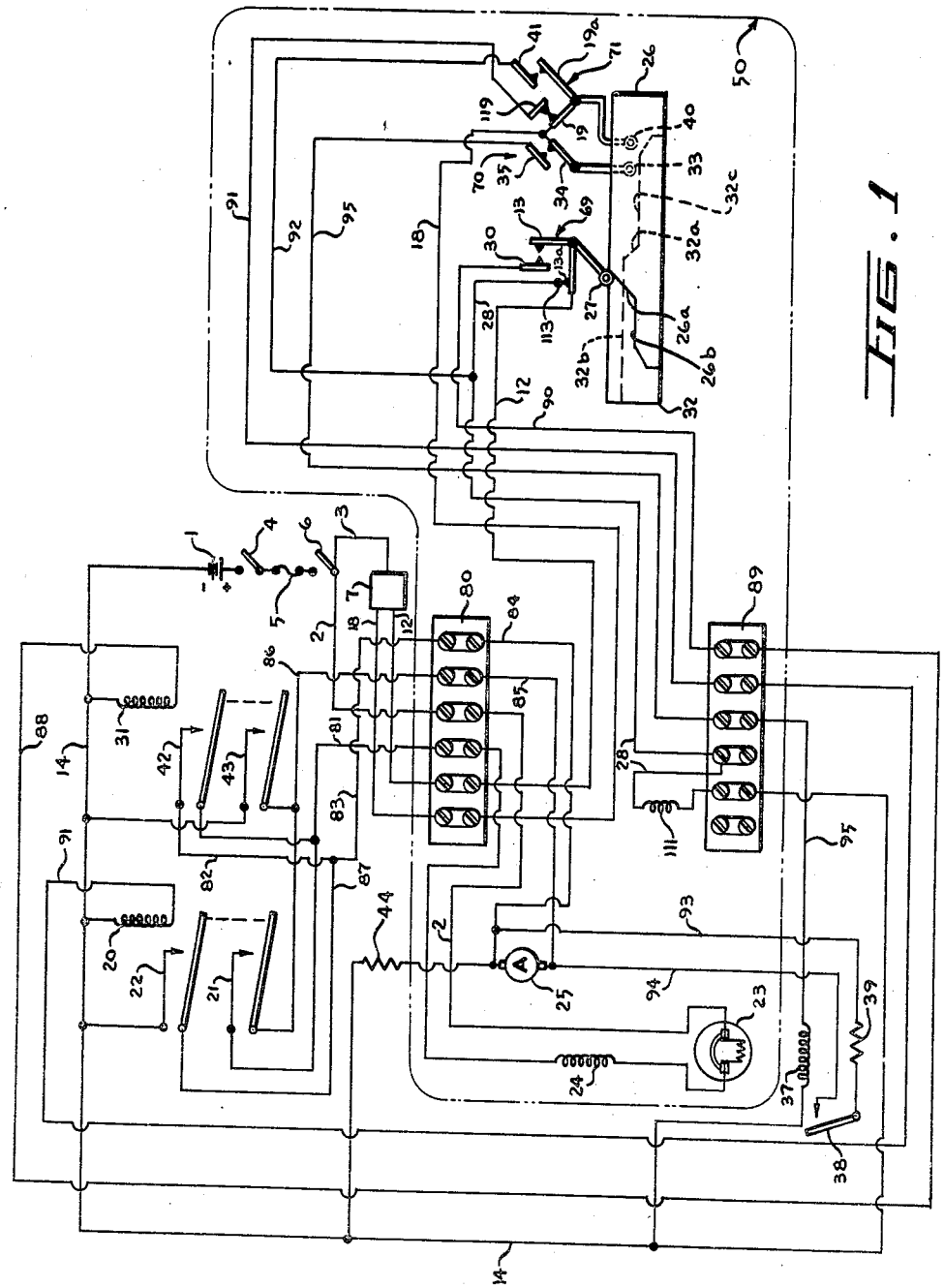

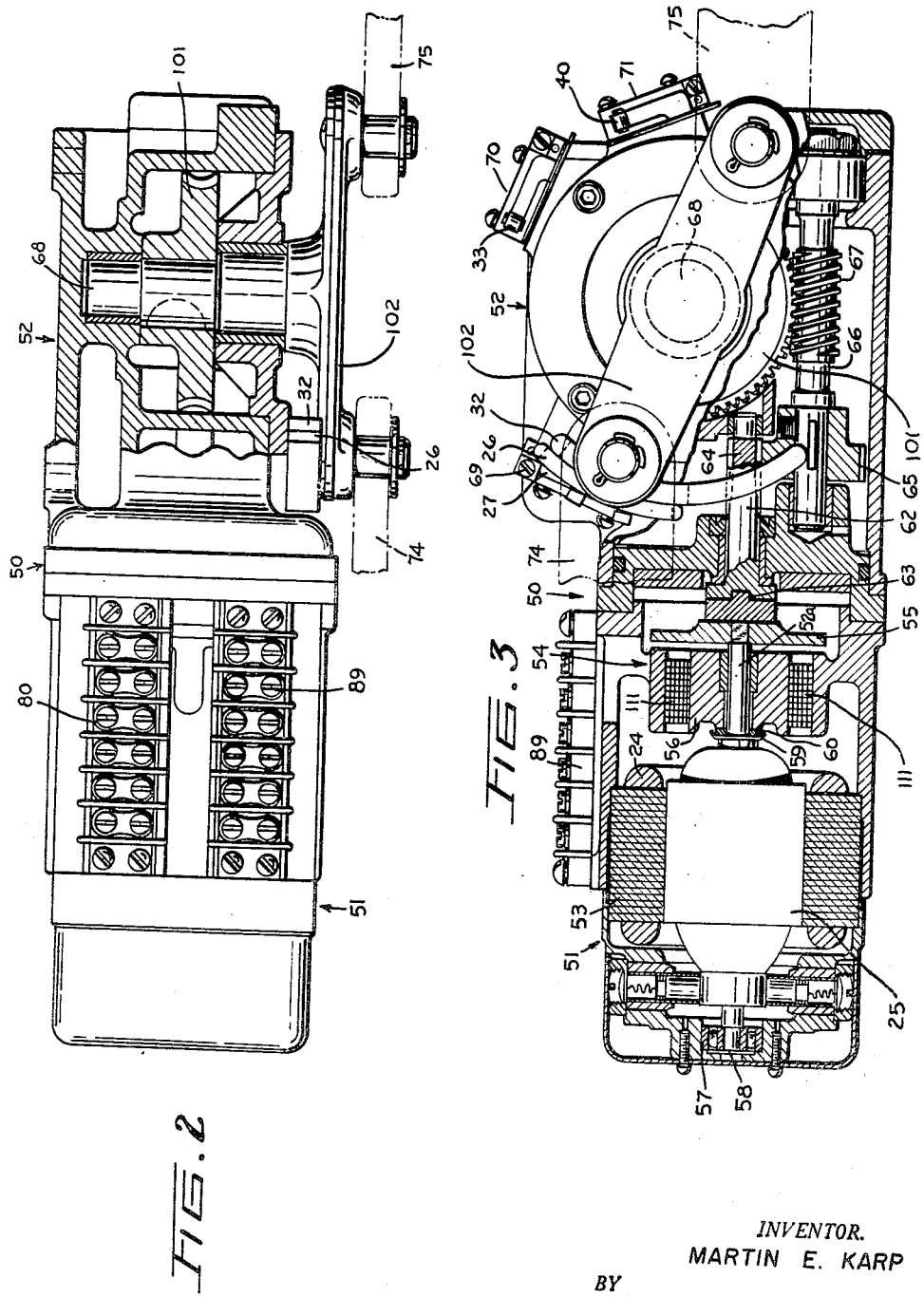

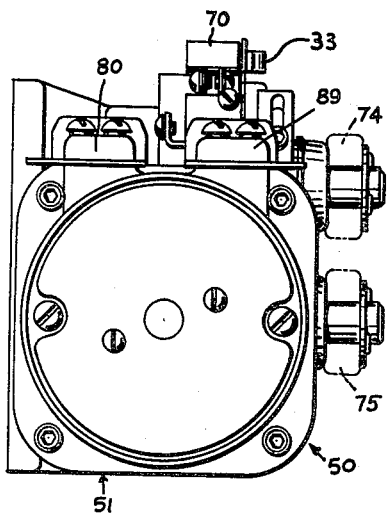
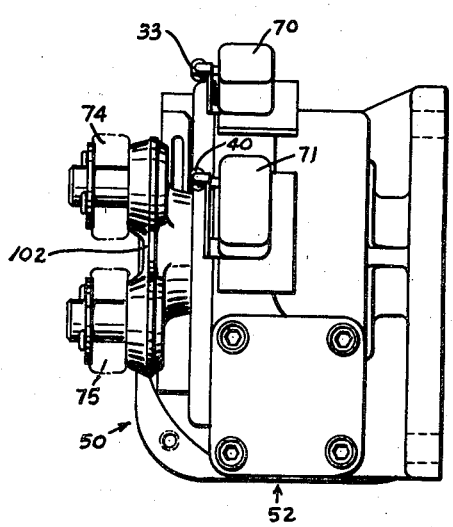
FIG. 4　　　FIG. 5
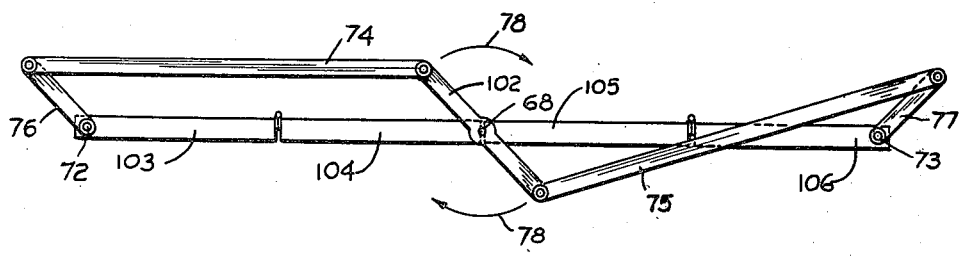
FIG. 6
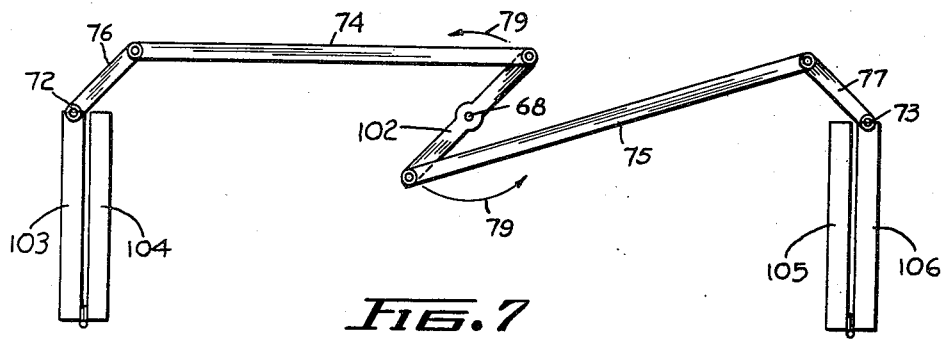
FIG. 7
INVENTOR.
MARTIN E. KARP
BY
ATTORNEY

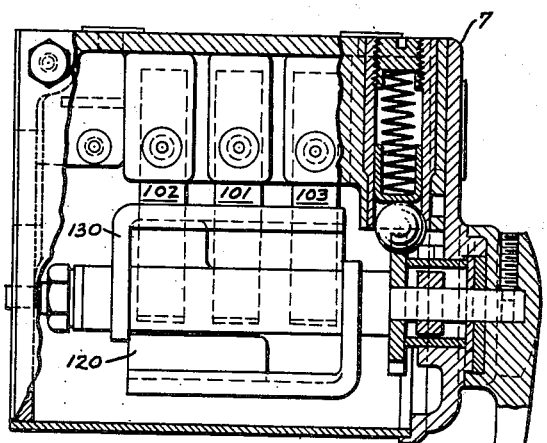
FIG.8
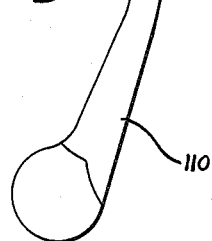
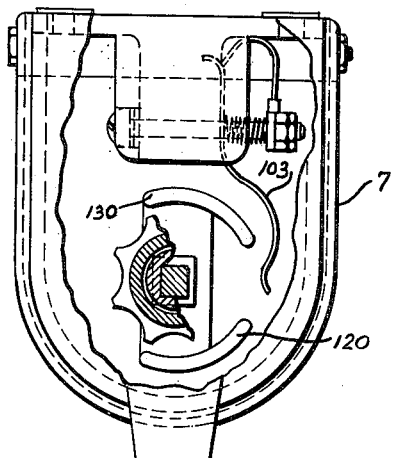
FIG.9
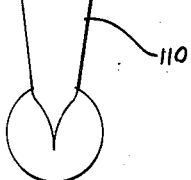

INVENTOR.
MARTIN E. KARP
BY
James and Franklin
ATTORNEY

United States Patent Office 2,941,795
Patented June 21, 1960

2,941,795
DOOR OPERATION AND CONTROL

Martin E. Karp, Norwalk, Conn., assignor to National Pneumatic Co., Inc., Boston, Mass., a corporation of Delaware Original application Mar. 30, 1953, Ser. No. 345,401, now Patent No. 2,820,627, dated Jan. 21, 1958. Divided and this application July 13, 1954, Ser. No. 443,034

6 Claims. (Cl. 268—63)

The present invention relates to apparatus for opening and closing doors, particularly doors of a public conveyance such as a bus or trolley, and to a control system therefor.

In almost all door operating systems in commercial use today, and particularly in cases where rapid door opening and closing is required, as in public conveyances where minimization of loading and unloading time is an important factor in maintaining proper schedules, pneumatic engines are employed to move the doors. Numerous proposals have been made for operating the doors directly by electric motors. The advantages of such systems over pneumatic systems have long been recognized—in particular, the mechanism is simpler, less liable to get out of adjustment, and no pumps or tanks for producing and holding fluid under pressure are required. However, despite these obvious advantages, no truly satisfactory all-electric system has been produced. Difficulties have arisen in controlling the speed of operation of the motor so that the doors, when opened and closed, will have the desired operating characteristics. For example, it is usually required that the doors should open rapidly but that they should close at a slower speed. In order to prevent the door from slamming into its stop when it is opened, means must be provided for slowing down the movement of the door when it is close to its fully open position. In general, the electrical connections necessary to produce these characteristics, insofar as motor control in general is concerned, have long been known. However, to produce a unit which will perform the desired operations automatically and dependably has been another matter entirely.

A further practical requirement calling for increased complexity of controls has revolved about the use of a braking mechanism which will hold the doors open or closed when the motorman, conductor or other responsible official desires that they should be in that position. Obviously, accidental opening of the door of a crowded bus while the vehicle is in motion would be exceedingly dangerous. Not quite so obvious, but almost as important, is the fact that the doors must be positively held against opening so that an individual bent upon self-destruction or mayhem cannot open the door in an unauthorized manner. The approach which the industry has taken in the past has largely revolved about the development in the motor of a holding torque when the doors are open or closed, this torque acting in opposition to any effort to move the doors. The development of such torque involves the use of an appreciable amount of power, and consequently constitutes a constant drain upon the electrical system. In addition, to energize a motor the armature of which is locked is to greatly reduce the life of that motor.

Braking mechanisms have been employed in systems of the type under discussion. They have in general involved the use of a magnetizable brake disk rotatable with the motor shaft and axially slidable therealong, in conjunction with an electromagnet which, when energized, pulls the brake disk into braked position. Careful machining of the motor shaft is required for this mode of operation. The present invention greatly simplifies this subsidiary problem by mounting the brake shaft on the motor shaft, the shaft and the brake disk axially moving together when the brake is energized. The shaft is normally held in unbraked condition by means of a resilient member acted thereupon, which may take the form of the leaf spring which is normally active on the conventional bearing of the motor shaft. In this way proper braking action is achieved without utilizing any additional parts and at the same time reducing the expense involved in the careful machining of the motor shaft.

The system of the present invention, insofar as control of a single door is concerned, revolves about the energization of the driving motor only during those periods of time when the door is actually to be moved. When the door is fully open, or when the door is fully closed, the motor is automatically de-energized. The door is held in open or closed position by means of an electromagnetically energized brake, preferably of the type described in the preceding paragraph, the control system being so arranged that the brake is energized only when the door is fully in the position to which the manual control switch actuated by the motorman is set. Thus, when the switch is set to close the door, the brake will be energized and the motor will be de-energized when the door is closed. For any other position of the door the brake will be de-energized and the motor will be energized in such a way as to move the door to fully closed position. Similarly, when the control switch is set to open the door, the brake will be energized and the motor will be de-energized whenever the door is fully open, and for all other positions of the door the brake will be de-energized and the motor will be energized in such a way as to move the door to open position. Since the power consumption of the brake is only a very small fraction of the power consumption which would be involved in developing a holding torque in the motor, and since the doors will actually be moved between their open and closed positions only for a very small proportion of the time during which the vehicle is in operation, the saving in power consumption in accordance with the system of the present invention will be apparent. In addition, the life of the motor will be greatly extended and its susceptibility to breakdown will be correspondingly decreased.

These objectives are accomplished by utilizing a pair of manually actuated control switches so interlocked that one is open when the other is closed, these switches functioning in conjunction with a plurality of simple and positively operated door-position-sensitive switches appropriately connected in the control circuit. In a preferred form of this invention, the motor and the door-position-sensitive switches are contained within a single unit which also includes the brake, that unit being mountable and demountable as such on the vehicle, and preferably in close proximity to the door which it is to operate. In the case of doors formed in two sections, each swingable about a vertical pivot shaft, as is common in surface transportation vehicles, the output shaft of the motor unit is preferably located midway between said vertical pivot shafts and connected to the door sections by an appropriate simple linkage, so that rotation of the motor shaft in one direction or the other will cause the doors to open or close.

Means are provided for slowing down the operation of the motor when it is rotating in a direction to open the doors and when the doors are closed to their fully open position, in order ot cushion the last part of their opening movement. For this purpose a door-position-sensitive switch is employed, mounted on the motor unit in the same manner as the other switches of that type. An independent means is provided for reducing the speed of the motor when it rotates in a direction to close the doors. The circuit connections are such that no special switch is required to thus condition the motor, the closing speed-reducing means being operatively connected into the control circuit whenever the connections for the motor are such that it will rotate in a door-closing direction.

In most public conveyances, particularly of the surface transportation type, two doors are provided, one at the front and one toward the rear of the vehicle. It is necessary that the operator should have control over the doors so as to be able to open and close either or both, as desired. This has ordinarily been thought to add great complexity to the electrical control system. However, according to the present invention a simple manually actuated switch is provided which may be thrown in one direction or the other to open either the front or the rear door, and which may be thrown in either direction to a greater degree to open both doors. In addition, this switch is so related to the individual control systems for the doors that no added complexity is required in those control systems. Each door may have exactly the same control system as it would have if it were the only door to be operated by the switch.

To the accomplishment of the above, and to such other objects as may hereinafter appear, the present invention relates to the apparatus and system for door operation and control, as defined in the appended claims and as described in this specification, taken together with the accompanying drawings in which:

Fig. 1 is a schematic diagram of the electrical circuits involved in the control of one of the doors;

Figs. 2 and 3 are top plan and side elevational views of a single door-operating unit, including motor, brake, transmission and control switches, each of the views being partly broken away and cross sectioned in order to illustrate the details thereof;

Figs. 4 and 5 are opposite end elevational views of the unit of Fig. 2, Fig. 4 being taken from the left hand side of Fig. 2 and Fig. 5 being taken from the right hand side thereof;

Figs. 6 and 7 are top plan schematic views of the door operating linkage in cases where the doors are formed of two swingable sections, Fig. 6 showing the doors and linkage in fully closed position and Fig. 7 showing them in fully open position.

Fig. 8 is a side elevational view, partially broken away and cross sectioned of the master control switch for selective operation of front and rear doors;

Fig. 9 is a top plan view thereof, also partially broken away;

Figure 11:
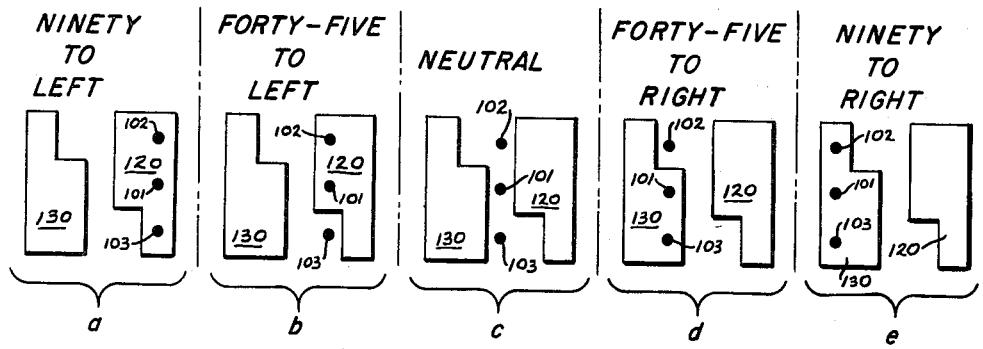
Fig. 11 is an idealized diagram illustrating the various connections used in the several operative positions of the master control switch.
Figure 10:
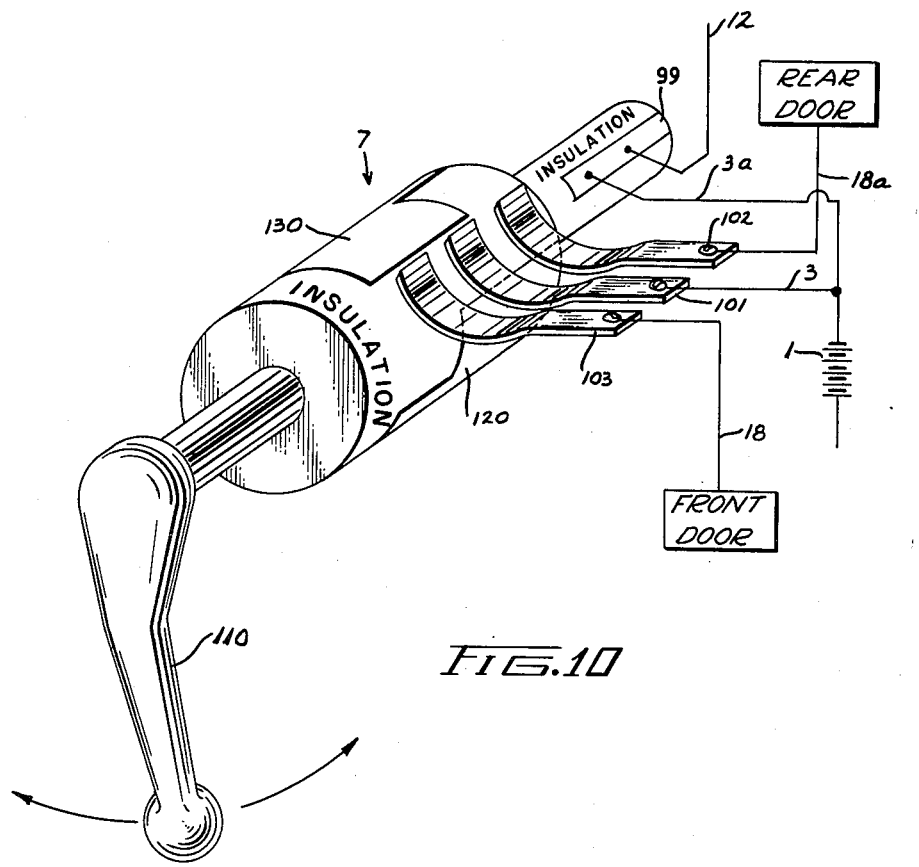
Fig. 10 is a perspective schematic view thereof illustrating the connections to the various doors.

This application is a division of my recently filed application Serial No. 345,401 of March 30, 1953, now Patent No. 2,820,627, issued January 21, 1958, entitled, "Door Operation and Control," and assigned to the assignee of the instant application, which was in turn a continuation of application Serial No. 309,266 of September 12, 1952, having the same title and the same assignee, which application is now abandoned.

The electric motor and control unit generally designated 50 and illustrated in Figs. 2-5 is in two parts 51 and 52, the former housing the motor, comprising an armature 25 mounted on a shaft 52a and surrounded by a stator 53 having field windings 24, and also including the brake assembly generally designated 54 and comprising a magnetizable brake disk 55 fast on the shaft 52a, the shaft 52a passing through and being rotatable within a rigidly mounted structure 56 within which the brake coil 111 is mounted. The left hand end of the shaft 52a is journaled within ball bearing 57, and leaf spring 58 extends up against the shaft end 52a and the inner portion of the bearing 57 so as to urge the shaft 52a to the right, movement of the shaft in that direction being limited by engagement between the washer 59 carried by the shaft and a thrust bearing 60 on the structure 56. When the shaft is in this position, the brake disk 55 is spaced from the brake structure 56, as shown in Fig. 3. When, however, the brake coil 111 is energized the disk 55 will be attracted to the left against the structure 56, where it will be frictionally locked in position. When the brake disk 55 thus moves, the entire shaft 52a will move to the left, causing the leaf spring 58 to be distorted. When energization of the brake coil 111 is terminated, the spring 58 will cause the shaft 52a and the brake disk 55 to resume their normal position shown in Fig. 3.

The second section 51a of the unit 50 houses the transmission and various of the control elements. It comprises a shaft 62 connected to a shaft 52a by means of clutch 63, the clutch being so arranged that the shafts 52a and 62 are connected for simultaneous rotation in all axial positions of the shaft 52a. The shaft 62 carries a pinion 64 meshing with gear 65, the latter rotating shaft 66 on which worm 67 is mounted, the worm in turn meshing with gear 101 fast on shaft 68 which extends out from the side of the housing part 51a and has crank arm 102 secured thereto. Cam units 26 and 32 are secured to one end of the arm 102 so as to rotate therewith, and switches 69, 70 and 71, having cam-engaging rollers 27, 33 and 40 respectively, are mounted on the exterior of the housing part 61 so as to be selectively engageable by the appropriate cams 26 and 32, as will be set forth more in detail hereinafter, in order to provide the desired control for the system.

The arm 102, rotated by the motor armature 25 in one direction or the other depending upon the direction of rotation of the armature 25, is operatively connected to the door to be opened in any appropriate manner. When two-section swingable doors are employed, as is common in surface transportation vehicles, the arrangement may take the preferred form shown in Figs. 6 and 7. There one door section formed of foldable parts 103 and 104 is pivotal about vertical shaft 72, while while the other door section, formed of parts 105 and 106, is pivotal about vertical shaft 73. The unit 50 is preferably so mounted on the vehicle that its output shaft 68 is positioned midway and in line between the shafts 72 and 73. The ends of arm 102 are pivotally connected to links 74 and 75, which are in turn pivotally connected to crank arm 76 and 77 respectively active on the door parts 103 and 106 respectively. Therefore when the arm 102 is in the position of Fig. 6 the doors will be fully closed, when that arm 102 is rotated in the direction of the arrows 78 the doors will be moved to fully open position, as shown in Fig. 7, and when the arm 102 is thereafter rotated in the direction of the arrows 79 the doors will be once again moved to their fully closed position.

The circuit arrangements employed for controlling the direction and speed of operation of the motor of a given door operating unit are shown in Fig. 1. All of the elements of that figure enclosed within the broken line area 50 form a part of the structural unit shown in Figs. 2-5. The remainder of the system may be located at any appropriate point in the vehicle.

A source of electrical power represented by the battery 1 may be connected by means of ignition switch 4, fuse 5, master power switch 6, and line 3 to the manually operated master control switch 7 adapted to be manipulated by the motorman or conductor. Two leads 12 and 18 extend from the switch 7, that switch being effective to cause one of the leads 12 or 18 at a time to be energized.

These leads extend to appropriate binding posts on terminal panel 80 mounted on the motor housing 50. From there lead 12 is connected to the two movable contacts 13 and 13a of switch 69. The lead 18 is electrically connected to the contacts 19 and 19a of switch 71, and is also connected to the contact 34 of switch 70. Lead 2 extends from the master power switch 6 to the terminal panel 80, from there through the thermostatic circuit breaker 23 to the field coils 24 of the motor, and then back to another binding post on the terminal panel 80, from which lead 81 extends to one side of normally open relay 42 and to one side of normally open relay 21. The other side of relay 42 is connected, by means of leads 82 and 83, to the terminal panel 80 where it is connected to wire 84 which connects with one end of the motor armature 25, the other end of the armature being connected by lead 85 and through the terminal panel 80 and lead 86 to one side of normally open relay 43 and the other side of normally open relay 21. Lead 87 connects lead 82 to one side of the normally open relay 22, the other side of which is connected to the ground lead 14, as is the other side of the relay 43. The relays 42 and 43 are simultaneously operated and are moved to closed position when the coil 31 is energized. The relays 21 and 22 are simultaneously operated and move to closed position when the coil 20 is energized. One end of coil 31 is connected to ground, and the other end is connected, by means of lead 88, terminal panel 89, and lead 90 to the contact 30 of switch 69 adapted to be engaged by the contact 13. One end of the coil 20 is connected to ground and the other end is connected, by means of lead 91, and the terminal panel 89 to the contact 119 of the switch 71 which is adapted to be engaged by the contact 19. The relays 21, 22, 42 and 43 are so connected that when the relays 21 and 22 are closed, the motor field coils 24 and the armature 25 will be energized so as to cause the motor to rotate in a given direction corresponding to opening movement of the doors. When the relays 42 and 43 are closed, current will flow through the motor armature 25 in the opposite direction, thus causing the motor to rotate in the opposite direction so as to close the doors.

One end of the brake coil 111 is connected to ground through the terminal panel 89, and its other end is connected via lead 28 to the contact 113 of the switch 69 adapted to be engaged by the contact 13a. Lead 92, in conjunction with lead 28, connects said other end of the brake coil 111 to the contact 41 of the switch 71 adapted to be engaged by the contact 19a.

A resistor 39 is connected across the armature 25 by means of lead 93, normally open relay 38 and lead 94. When the relay 38 is closed the presence of the resistor 39 in shunt with the armature 25 will cause the motor to operate more slowly. This resistor 39 is employed to slow down the speed of operation of the motor when the door is being opened and when it is near its fully open position. The energizing coil 37 for the relay 38 has one end connected to ground, the other end being connected through terminal panel 89 and lead 95, with contact 35 of switch 70, adapted to be engaged by contact 34.

A resistor 44 is connected between ground and the upper end of the armature 25. The purpose of this resistor is to cause the motor to rotate at a reduced speed when operating in door-closing direction. The operation of the relays 21, 22, 42 and 43 operatively connect and disconnect the resistor 44 from the circuit, and no special contacts are required for it.

Fig. 1 schematically shows the cams 26 and 32 in conjunction with the cam-engaging rollers 27, 33 and 40 of the switches 69, 70 and 71 respectively. The cam 26 comprises an inclined portion 26a adapted to engage the roller 27 and a lower portion 26b which clears the roller 27. The cam 26a is so positioned that the roller 27 will be engaged by the surface 26a only when the door is fully closed, that is to say, when the cam is in the position shown in Fig. 1, this causing contacts 13a and 113 to engage and contacts 13 and 30 to disengage. As soon as the door has moved away from its fully closed position, thus causing the cam 26 to move to the right in Fig. 1, the roller 27 will be released, contacts 13a and 113 will separate, and contacts 13 and 30 will engage.

The cam 32, as schematically shown in Fig. 1, comprises a lower portion 32c which clears the rollers 33 and 40 of the switches 70 and 71 respectively, an inclined surface 32a adapted to engage the rollers 33 and 40 and thus move the switches from the position which they assume in Fig. 1, and a raised portion 32b adapted to hold the switches in the positions to which they have been moved. When, as is the case in Fig. 1, the door is fully closed, switch 70 will be opened, and in switch 71 contacts 19 and 119 will be engaged, while contacts 19a and 41 will be disengaged. As the door is moved toward its open position, the cam surface 32a will first engage the roller 33 and cause the contacts 34 and 35 of the switch 70 to engage. As the door continues to move toward its open position the roller 33 will ride up on the cam surface 32a, thus holding the switch 70 closed, and then, at some later point, the roller 40 will be engaged by the surface 32a, the contacts 19 and 119 will separate, and the contacts 19a and 41 will engage.

When the master control switch 7 is set for door closing operation, the lead 18 will be de-energized and the lead 12 will be energized. When the door is closed, a circuit can be traced from the battery, through lead 12, contacts 13a and 113, and lead 28 through the brake coil 111 to ground. This is the only live circuit, all of the relays 21, 22, 42, 43 and 38 being in their normally open position. Hence the motor is deenergized and only the brake is energized. This represents but a nominal drain on the battery, when it is realized that only three or four watts are consumed by the brake, whereas energization of the motor to develop an appreciable holding torque would have involved a drain of 35 to 45 watts.

If now it is desired to open the door, the control switch 7 is appropriately manipulated, de-energizing line 12 and energizing line 18. Since line 12 is de-energized, the brake 111 becomes de-energized. A circuit may be traced from the battery, through line 18, contacts 19 and 119, lead 91, through the energizing coil 20 to ground, thus closing the relays 21 and 22. This represents the only live circuit at this point in the operation, since the contacts 13a and 113 are no longer connected to the battery. When the relays 21 and 22 are closed, a circuit may be traced from the battery via the lead 2 through the motor field coil 24, and then, via lead 81 and closed relay 21, lead 86 and lead 85 to the lower end of the armature 25, through the armature to the upper end thereof, and then, via leads 84, 83 and closed relay 22 to ground. This will cause the motor to rotate in such a direction as to open the door. The resistor 44 is connected between the upper end of the armature 25 and ground, but is short-circuited by the leads 84 and 83 and the relay 22, and therefore does not affect the operation of the motor.

As the door commences to move to open position the cams 26 and 32 will move to the right, and the first effect will be to release the roller 27 of the switch 69, thus causing contacts 13a and 113 to separate and contacts 13 and 30 to engage. However, since the line 12 energizing the contacts 13a and 13 of the switch 69 is no longer connected to the battery, this will have no immediate effect.

When the door has approached to within a predetermined distance from its fully open position, the cam surface 32a will engage roller 33 and cause the contacts 34 and 35 of switch 70 to engage. Since lead 18 is live, this will complete a circuit from the battery 1 through the contacts 34 and 35, and via the lead 95 through the coil 37 to ground. This energization of the coil 37 will cause the relay 38 to close, thus connecting the resistor 39 across the armature 25, thus causing the motor to rotate at a reduced speed. When the door reaches its fully open position the cam surface 32a will engage the roller 40 and actuate the switch 71 so as to separate the contacts 19 and 119 and engage the contacts 19a and 41. Separation of the first pair of contacts de-energizes the coil 20, the relays 21 and 22 open, and the motor is de-energized. Engagement of the second pair of contacts completes a circuit from the battery 1 through lead 18 and contacts 19a and 41 via leads 92 and 28 through the brake coil 111 to ground, thus energizing the brake. Hence when the switch 7 is set to "open" position and when the door has reached that position, the motor is automatically de-energized and the holding brake is automatically applied.

If now the switch 7 be again set to "closed" position line 18 is de-energized and line 12 is energized. De-energization of line 18 de-energizes the switches 70 and 71. Hence the brake coil 111 and the relay coil 37 are both de-energized, the motor is released for rotation, and the relay 38 opens, thus effectively disconnecting the resistor 39 from the circuit. Energization of the line 12 completes the circuit from the battery 1 through the contacts 13 and 30 and via the leads 90 and 88 through the coil 31 to ground. This energization of the coil 31 closes the relays 42 and 43. When that occurs a circuit is completed from the battery 1 through the lead 2, the motor field coil 24, lead 81, relay 42, leads 82, 83 and 84 to the upper end of the armature 25, through the armature to the lower end thereof, and then, via leads 85 and 86 and relay 43 to ground. It will be noted that the direction of current flow through the field coil 24 is the same as when the relays 21 and 22 are closed, but that the direction of current flow through the armature 25 is reversed. Consequently the motor will rotate in the opposite direction. In addition, the resistor 44 is now connected in parallel with the armature 25, and thus functions to reduce the speed of operation when compared to its normal opening speed. A separate resistor 44 is employed for this purpose instead of utilizing resistor 39 because it is usually desired that the closing speed should be different from the "cushioning" speed at the end of the opening movement.

As the door moves to closed position, the cams 26 and 32 will move to the left as viewed in Fig. 1, sequentially releasing the rollers 40 and 33 of the switches 71 and 70 respectively. These switches will therefore assume the position shown, but since the lead 18 has been disconnected from the battery 1, these switches are not energized and their changing of position will have no effect.

When the door reaches its fully closed position the cam surface 26a will engage the roller 27 of the switch 69, thus causing separation of the contacts 13 and 30 and connection of the contacts 13a and 113. Separation of the first set of contacts opens the circuit through the coil 31, the relays 42 and 43 will open, and the motor will be de-energized. Engagement of the second pair of contacts will complete a circuit through the brake coil 111, as previously described, and the door will therefore be held in closed position.

Since it is only when the brake coil 111 is energized that any braking effect is applied, it will be apparent that upon power failure or in case of any other emergency, the doors are or may readily be released for manual operation to permit escape from the vehicle.

The master control switch 7 illustrated in Figs. 8–11 is specifically designed for operation with the system just described, and for control of a pair of doors, such as a front door and a rear door, so that the operator may open either or both of the doors as conditions dictate. The switch is illustrated as having five operative positions, represented by the letters a, b, c, d and e of Fig. 11, position c being a neutral position, position d representing a rotation of the operating handle 110 45 degrees to the right, position e representing rotation of the handle 110 90 degrees to the right to clockwise, position b representing rotation of the door 110 45 degrees to the left or counterclockwise from position c, and position a representing rotation of the handle 110 90 degrees to the left from position c. To the handle 110 is operatively connected a pair of separated conductive segments 120 and 130, each of the segments being shaped as best shown in Fig. 11. Cooperating with those segments are three contact fingers 101, 102 and 103, finger 101 being connected by lead 3 to the battery 1, finger 103 being connected to lead 18 which extends to the control system of the front door, and finger 102 being connected to lead 18a connected to the control system of the rear door. The electrical structure thus far described describes a first manual switch at least one element of which is closed when the switch is in any position other than position c. When the switch is in position c none of the fingers 101, 102 or 103 engage with either of the conductive segments 120 or 130. Hence both leads 18 and 18a are de-energized. When the switch is moved to position d only fingers 101 and 103 are bridged, thus energizing lead 18. When the switch is in position b only fingers 101 and 102 are bridged, thus energizing lead 18a. When the switch is in either of positions a or e, finger 101 is connected with both fingers 102 and 103, and hence both leads 18 and 18a are energized.

A second switching arrangement is also actuated by the handle 110, that switch comprising a bridging conductive strip 99 which connects lead 3a to lead 12 only when the switch is in position c. In all other positions the connection between leads 3a and 12 is broken. Lead 3a is connected to the positive side of the battery 1 and lead 12 goes to both the front and rear door control systems.

Hence it will be appreciated that when the switch is in its neutral position c, with leads 18 and 18a de-energized and leads 12 to the control system of both doors energized, the doors, if open, will close, and if they are closed, their respective brake coils 111 will be energized to hold them closed, their respective driving motors being de-energized. If the switch is moved to any of its other operative positions the leads 12 to both door operating systems will be de-energized, and one or the other or both of the leads 18 and 18a to the front and rear door operating systems respectively will be energized, thus causing the appropriate door or doors to open if closed or to remain open if open. The brakes of the respective doors will be energized when the doors are in the positions called for by the switch 7, at which time their respective motors will be de-energized.

From the above description it will be apparent that I have produced a simple, compact and positively acting door operating unit driven by a reversible electric motor and having an electrically energized brake and various door-position-sensitive switches as a part thereof. I have further produced a control system for a unit of that type which satisfies the operating requirements specified commercially, which minimizes power consumption by only energizing the motor when the position of the door is to be changed, and which correspondingly increases the operating life of the equipment. The system is particularly well adapted to be utilized in conjunction with the selective control of a plurality of doors, a single switch of novel construction being employed to permit the operator to cause either or both of the doors, as desired, to open or close.

While but a single embodiment of the present invention has been here specifically described, it will be apparent that many variations may be made therein, all within the spirit of the invention as defined in the following claims.

I claim:

1. In a door control system including a pair of doors, separate driving means operatively connected to said doors for independently moving them, individual electrically actuated control means for said driving means, and a source of electrical power; a control member comprising first, second and third switches, said switches being electrically connected between said source of power and said electrically actuated control means as follows: said first switch to the control means for one of said doors, said second switch to the control means for both said doors, and said third switch to the control means for the other of said doors, manual means operatively connected to said switches for selectively actuating them, said manual means having five operative positions, only said second switch being closed in one operative position of said manual means, said second switch being open in all four other operative positions thereof, both of said first and third switches being closed in either of two operative positions thereof, and either said first or said third switch being closed in one or the other of said remaining operative positions respectively.

2. The system of claim 1, in which said second switch is closed in the intermediate operative position, said third switch alone is closed in the next adjacent operative position in one direction from said intermediate operative position, said first switch alone is closed in the next adjacent operative position in the other direction from said intermediate operative position, and both said first and third switches are closed in both extreme operative positions.

3. In a door control system including a pair of doors, separate driving means operatively connected to said doors for independently moving them, individual electrically actuated control means for said driving means, and a source of electrical power, a control member comprising first and second switches each electrically connected between said source of power and the control means for a different one of said doors, and manual means operatively connected to said switches for selectively actuating them, said manual means having an intermediate operative position and two additional operative positions to each side of said intermediate position, one adjacent and the other remote from said intermediate operative position, both of said switches being open when said manual means is in its intermediate operative position, both of said switches being closed when said manual means is in either of its operative positions remote from said intermediate position, and one or the other of said switches being closed respectively when said manual member is in one or the other of its operative positions adjacent said intermediate position respectively.

4. A door control system including a pair of doors, separate driving means operatively connected to said doors for independently moving them, individual electrically actuated control means for said driving means, and a source of electrical power; a control member comprising first, second and third pairs of contacts, said pairs of contacts being electrically connected between said source of power and said electrically actuated control means as follows: said first pair of contacts to the control means for one of said doors, said second pair of contacts to the control means for both of said doors, and said third pair of contacts to the control means for the other of said doors, manual means operatively connected to said pairs of contacts for selectively actuating them to circuit-closing and circuit-opening conditions respectively, means operative between said pairs of contacts and effective to ensure that said second pair of contacts is open whenever either of said first and third pairs of contacts is closed, means operatively connected to said first and third pairs of contacts and effective, when said contacts are in circuit-closing condition, to actuate their respective control means to open their respective doors, and means operatively connected to said second pair of contacts and effective, when said contacts are in circuit-closing position, to actuate both of said individual control means to close their respective doors.

5. In the system of claim 1, means operatively connected to said first and third switches and effective, when said switches are in closed condition, to actuate their respective control means to open their respective doors, and means operatively connected to said second switch and being effective, when said switch is in closed position, to actuate both of said individual control means to close their respective doors.

6. The system of claim 5, in which said second switch is closed in the intermediate operative position, said third switch alone is closed in the next adjacent operative position in one direction from said intermediate operative position, said first switch alone is closed in the next adjacent operative position in the other direction from said intermediate operative position, and both said first and third switches are closed in both extreme operative positions.

References Cited in the file of this patent

UNITED STATES PATENTS

| Number | Name | Date |
|---|---|---|
| 847,165 | Cowles | Mar. 12, 1907 |
| 1,570,304 | Hynes | Jan. 19, 1926 |
| 1,626,672 | Farmer | May 3, 1927 |
| 1,736,390 | Brubaker | Nov. 19, 1929 |
| 1,795,790 | Murphy | Mar. 10, 1931 |
| 1,931,404 | Clussman | Oct. 17, 1933 |
| 2,095,267 | Riverman et al. | Oct. 12, 1937 |
| 2,568,808 | Johanson | Sept. 25, 1951 |
| 2,619,345 | Davidson | Nov. 25, 1952 |
| 2,661,945 | Hamilton | Dec. 8, 1953 |

FOREIGN PATENTS

| 444,718 | Great Britain | Mar. 26, 1936 |